United States Patent
Bapiraju et al.

(10) Patent No.: US 11,740,607 B2
(45) Date of Patent: Aug. 29, 2023

(54) METHOD AND SYSTEM FOR MONITORING CONDITION OF ELECTRIC DRIVES

(71) Applicant: ABB Schweiz AG, Baden (CH)

(72) Inventors: Jampana Veera Venkata Naga Bapiraju, Bangalore (IN); Nikhil Podila Venkata Saisantosh, Bangalore (IN); Arpit Sisodia, Bangalore (IN); Ramesh Siddalingaiah, Bangalore (IN)

(73) Assignee: ABB Schweiz AG, Baden (CH)

( * ) Notice: Subject to any disclaimer, the term of this patent is extended or adjusted under 35 U.S.C. 154(b) by 725 days.

(21) Appl. No.: 16/557,041

(22) Filed: Aug. 30, 2019

(65) Prior Publication Data

US 2020/0073361 A1 Mar. 5, 2020

(30) Foreign Application Priority Data

Aug. 30, 2018 (IN) .............................. 201841032571

(51) Int. Cl.
*G05B 19/406* (2006.01)

(52) U.S. Cl.
CPC .. *G05B 19/406* (2013.01); *G05B 2219/34427* (2013.01)

(58) Field of Classification Search
None
See application file for complete search history.

(56) References Cited

U.S. PATENT DOCUMENTS

| | | | | |
|---|---|---|---|---|
| 11,581,835 | B1 * | 2/2023 | Maharjan | H02P 29/662 |
| 2012/0133313 | A1 * | 5/2012 | Xie | B60W 20/00 |
| | | | | 318/473 |
| 2015/0048772 | A1 * | 2/2015 | Nagata | H02K 11/25 |
| | | | | 318/634 |
| 2020/0132773 | A1 * | 4/2020 | Gugaliya | G07C 3/14 |
| 2020/0341062 | A1 * | 10/2020 | Wang | G01N 25/72 |
| 2021/0055240 | A1 * | 2/2021 | Konishi | H02P 29/60 |
| 2022/0286022 | A1 * | 9/2022 | Wystup | H02K 11/25 |
| 2022/0286079 | A1 * | 9/2022 | Haderer | H02P 29/68 |
| 2022/0291649 | A1 * | 9/2022 | Azar | F03D 7/045 |
| 2022/0299377 | A1 * | 9/2022 | Hino | G01K 3/04 |

FOREIGN PATENT DOCUMENTS

| | | | | |
|---|---|---|---|---|
| EP | 3809587 | A1 * | 4/2021 | |
| EP | 3926426 | A1 * | 12/2021 | |
| EP | 3627121 | B1 * | 7/2022 | ............. G01K 13/10 |

* cited by examiner

*Primary Examiner* — Jennifer L Norton
(74) *Attorney, Agent, or Firm* — Leydig, Voit & Mayer, Ltd.

(57) ABSTRACT

The present disclosure relates to monitoring a condition of an electric drive in an industrial network. A method comprises obtaining values of input parameters, state parameters, and one or more temperatures associated with one or more components, at a first time instant. The method further comprises estimating values of the state parameters at a second time instant with a first layer of a state space model of the electric drive and the values of input parameters at the first time instant. In addition, the method comprises estimating values of the one or more temperatures at a third time instant with a second layer of the model, the values estimated for the state variables and the values of the temperatures at the first time instant. A condition of the electric drive is determined from the values of the temperatures estimated for the third time instant and one or more predetermined thresholds.

18 Claims, 5 Drawing Sheets

METHOD AND SYSTEM FOR MONITORING CONDITION OF ELECTRIC DRIVES

CROSS REFERENCE TO RELATED APPLICATION

This application claims priority to Indian Patent Application No. 201841032571, filed Aug. 30, 2018, the entire disclosure of which is incorporated herein by reference.

TECHNICAL FIELD

The present disclosure relates generally to electric drives in an industrial network. More particularly, the present disclosure relates to condition monitoring of electric drives.

BACKGROUND

Electric drives in an industrial network are generally used to control operation of low voltage and medium voltage electric motors that power various industrial applications. Performance and reliability of such industrial applications depends on condition of the electric drives. Condition of an electric drive depends on condition of various power electronic components of the electric drive such as inverters and diodes. Deterioration in condition of the power electronic components affects a performance and reliability of the electric drive, which in turn results in failures, and operation downtimes of the industrial applications.

Usually, abnormal motor loads, variations in power supply, and changing environmental conditions over time, leads to deterioration in the condition of the power electronic components. Deterioration in the condition of the components results in overheating and rise in temperature of the electric drive and associated temperature faults. Hence, monitoring temperature of the electric drive is useful for monitoring the condition of the electric drive, and in predicting the temperature faults.

Predicting the temperature of the electric drive few hours prior to occurrence of a temperature fault is advantageous as preventive maintenance actions may be taken to avoid the temperature fault. However, predicting the temperature of the electric drive is a multi-dimensional computational task. Limited availability of measurement data related to the electric drive makes thermal failure analysis and predictions difficult.

Some prior art techniques predict temperature faults based on limited input parameters, for example switching frequency and current. However, temperature of the electric drive is dependent on various input parameters and state parameters of the electric drive, which need to be considered during the prediction.

Hence it is desired to have alternate methods for monitoring the condition of an electric drive.

SUMMARY

An aspect of the present disclosure provides a method for monitoring a condition of an electric drive that controls operation of an electric motor in an industrial network. The condition is monitored by estimating values of one or more temperatures associated with one or more components of the electric drive. The method is performed by a network device communicatively coupled to the electric drive. In an example, the network device is a server that communicates with the electric drive via an Ethernet adaptor coupled with the electric drive. The server may be installed in a cloud network, to facilitate remote monitoring of the condition of the electric drive. Alternatively, the network device may be a gateway device or a controller capable of communicating with the electric drive.

The network device obtains values of input parameters (input values) associated with an operation of the electric drive, values of state parameters (state values) associated with an output of the electric drive, and values of the one or more temperatures (temperature values) associated with the one or more components at a first time instant. The input parameters and the state parameters affect the one or more temperatures associated with the one or more components of the electric drive. The one or more components of the electric drive include one or more of, but not limited to, a heatsink, a control board, and a body of the electric drive. Accordingly, the one or more temperatures include a heatsink temperature ($T_{inv}(n)$), a control board temperature ($T_{CB}(n)$), and an overall temperature ($T_{Drive}(n)$) of the body of the electric drive.

In an embodiment, the input parameters include a voltage across the one or more components of the electric drive (Udc), a switching frequency ($F_{switch}$) of an inverter of the drive, an ambient temperature at the electric drive ($T_{ambient}$), and a time period of operation of one or more components of the drive. For example, the time period of a cooling fan of the electric drive (Fan_On) can be an input parameter. Similarly, the input parameters may include an on time of a break chopper circuit associated with the electric drive, as the break chopper circuit dissipates DC link energy which results in rise in temperature of the one or more components. The input parameters may also include static thermal parameters retrieved form a data sheet of the one or more components, for example an inverter of the electric drive.

The state parameters may include, a current flowing through the one or more components (Idc) or output current, a frequency of the output current (Freq), and energy transferred (E_kWh) to the electric motor from the electric drive over a time period. Typically, the output current is a measure current flowing through the inverter, comprising of insulated gate bipolar transistors (IGBTs) and diodes. The output current affects the one or more temperatures of the electric drive through conduction losses ($i^2R$), where 'R' is the effective resistance of the inverter and 'i' is the output current. Similarly, the frequency of output current affects a power of the electric drive, as reduction in impedance of the inverter at low frequency results in increase in the current, which in turn affects a temperature rise.

The method further includes estimating values of the state parameters at a second time instant with a first layer of a state space model of the electric drive and the values of the input parameters and the state parameters obtained at the first time instant. The estimated values of the state parameters at the second time instant, and the values of the one or more temperatures obtained at the first time instant are used to estimate values of the one or more temperatures at a third time instant with a second layer of the state space model of the electric drive.

In an embodiment, the state space model is two-layer model, which represents a thermal behavior of the electric drive. The first layer of the state space model corresponds to an internal drive operation, and represents a relationship between the input parameters and the state parameters. In one embodiment, the first layer includes a forced response matrix (Q) that contains one or more coefficients associated with the input parameters and a natural response matrix (P) that includes coefficients of the state parameters. The first layer can be illustrated as follows:

$$\begin{bmatrix} i(n+1) \\ Freq(n+1) \\ E\_kWh(n+1) \\ i^2(n+1) \end{bmatrix} = P_{4\times4} \cdot \begin{bmatrix} i(n) \\ Freq(n) \\ E\_kWh(n) \\ i^2(n) \end{bmatrix} + Q_{4\times4} \cdot \begin{bmatrix} Udc(n) \\ F_{switch}(n) \\ T_{ambient} \\ Fan\_On(t) \end{bmatrix},$$

where, Udc(n), $F_{switch}$(n), $T_{ambient}$ and Fan_On(t), are the input parameters at the first instant, i(n), Freq(n), $E_{kW}$h(n), and $i^2$(n), are the state parameters at the first instant, and i(n+1), Freq(n+1), $E_{kW}$h(n+1), and $i^2$(n+1) are the state parameters estimated at the second time instant.

The one or more coefficients of the forced response matrix (Q) and the natural response matrix (P) are initialized with certain predetermined values associated with the internal drive operation of the electric drive. For example, the initialization can be according to operator knowledge of relationship between the input parameters and the state parameters, randomly initialized etc. The one or more coefficients are updated using history data (obtained over a period of time) of the input parameters and the state parameters. The coefficients are updated using a first order iterative optimization method. The first order iterative optimization method may be used to update the one or more coefficients. Example of the first order iterative optimization methods include, but are not limited to, gradient descent and recurrent neural network based learning method. Such updating of coefficient optimizes the first layer that is initialized based on certain predetermined values. As a result, prediction accuracy of the state parameters estimated at the second time instant is improved.

The second layer of the state space model represents thermal dynamics of the electric drive based on the state parameters. The second layer defines a relationship between the state parameters and the one or more temperatures as shown below;

$$\begin{bmatrix} T_{inv}(n+1) \\ T_{CB}(n+1) \\ T_{Drive}(n+1) \end{bmatrix} = R_{3\times3} \cdot \begin{bmatrix} T_{inv}(n) \\ T_{CB}(n) \\ T_{Drive}(n) \end{bmatrix} + S_{3\times4} \cdot \begin{bmatrix} i(n) \\ Freq(n) \\ E\_kWh(n) \\ i^2(n) \end{bmatrix},$$

where, matrix (R) includes coefficients of the one or more temperatures, matrix (S) includes coefficients of the state parameters, $T_{inv}$(n), $T_{CB}$ (n), and $T_{Drive}$ (n) represent the one or more temperatures obtained at the first time instant, i(n) Freq(n) $E_{kW}$h(n) and $i^2$(n) represent the state parameters estimated at the second time instant, and $T_{inv}$ (n+1)$T_{CB}$ (n+1) and $T_{Drive}$(n+1), represent the one or more temperatures estimated at the third time instant.

The one or more temperature values estimated at the third time instant, are used to determine a condition of the electric drive at the third time instant. The condition of the electric drive is selected from one or more conditions of the electric drive, by comparing the values of the one or more temperatures with one or more predetermined thresholds. The one or more predetermined thresholds represent a severity associated with the one or more conditions.

For example, the condition is determined to be a normal operating condition when a value of a temperature of the one or more temperatures is less than a first threshold for the temperature. Here, the condition is determined to be a warning condition when a value of a temperature of the one or more temperatures is greater than the first threshold but less than a second threshold for the temperature. Alternately, the condition is determined to be a fault condition when a value of a temperature of the one or more temperatures is greater than the second threshold for the temperature.

The condition is determined for controlling values of the one or more temperatures over a time period. Preventive maintenance actions required for the electric drive can be planned based on the determined condition. For example, if a fault condition is determined to occur at the third time instant, preventive maintenance actions required to avoid the fault condition can be taken prior to occurrence of the fault condition. Preventive maintenance actions may include reducing an input current to the electric drive, or increasing a cooling time of the electric drive to reduce the one or more temperature values.

The condition determined can be provided to a user interface associated with the network device. For example, the determined condition is communicated to a remote server that is accessible to a user of a maintenance/service team. Alternatively, the determined condition is communicated to a mobile device capable of communicating with the network device.

In an embodiment, a timer is provided along with the determined condition to the user interface. The timer indicates a time left before occurrence of the determined condition. In case the determined condition is a fault condition, the timer updates time left to the time of occurrence for the fault condition viz. as the third time instant approaches closer. A confidence indicator is optionally associated with an occurrence of the determined condition. The confidence indicator signifies a confidence with which the determined condition would occur at the third time instant. The confidence indicator is determined based on history data of the condition.

Another aspect of the present disclosure provides a system for monitoring the condition of the electric drive. The system has a plurality of modules, each of which performs one or more steps of the method described above. In one embodiment, the system comprises an input unit, a model updation unit, a drive estimation unit, an optional data storage, and an optional communication interface. The modules are implemented with a processor(s) of the system. For example, the modules may be implemented with a processor of a server, a gateway device, an edge device or a controller associated with the electric drive (e.g. connected with the drive in the industrial network). In another example, the modules may be implemented with a server hosted on a cloud platform, and capable of communicating with the electric drive via a communication network.

The input unit receives values of input parameters associated with an operation of the electric drive, values of state parameters associated with an output of the electric drive, and values of the one or more temperatures associated with the one or more components. In an embodiment, the input unit receives the values with an Ethernet adaptor that is communicatively linked with the electric drive. The data storage (when provided) logs the values received at the input unit. For example, the data storage is a data lake configured store the data received on a continuous basis.

The model updation unit is configured to update one or more coefficients associated with the state space model by using values of the input parameters, the state parameters and the one or more temperature values, received at the input unit over a period of time. The updated state space model is stored within the data storage for further estimations on the one or more temperatures.

The drive estimation unit uses the updated state space model and the values of the input parameters, the state parameters and the one or more temperature values at a first time instant to estimate the values of the state parameters at a second time instant, and the one or more temperature values at a third time instant. The values of the state parameters estimated at the second time instant are used by the state space model (second layer), to estimate the one or more temperature values at the third time instant.

The drive estimation unit is also configured to determine a condition of the electric drive based on the temperature values estimated at the third time instant, for controlling the values. The communication interface communicates the determined condition to a user interface such as an online monitoring portal that is accessible to personnel of a maintenance team. Upon receiving the determined condition, the maintenance team may take preventive measures to avoid occurrence of a fault related condition.

DETAILED DESCRIPTION OF THE DRAWINGS

Figure 1:
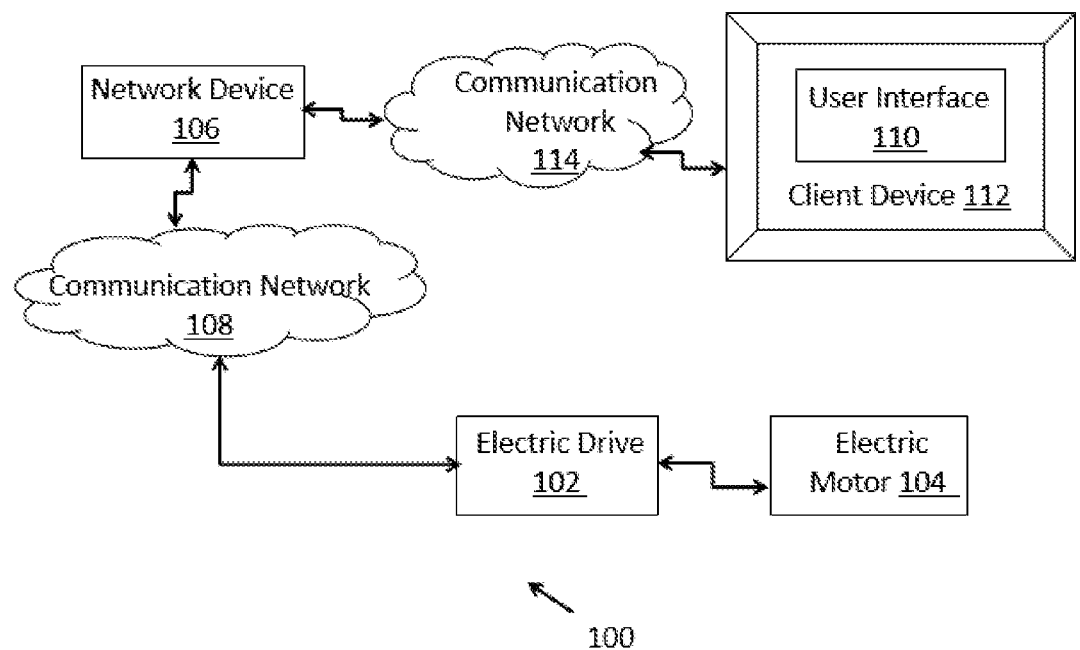
FIG. 1 is a simplified view of an industrial network in which various embodiments of the present disclosure can be practiced.

The present disclosure is related to monitoring a condition of an electric drive in an industrial network. Various embodiments of the present disclosure can be practiced in an environment such as environment 100 shown in FIG. 1. The environment 100 shown in FIG. 1 shows an industrial network where an electric drive (102) is connected to controls operation of an electric motor (104). The electric drive (102) is also in communication with a network device (106) over a communication network (108). The network device (106) can also be capable of communicating with a user interface (110) associated with a client device (112) over a communication network (114). Though the environment 100 shows a single electric drive (102) monitored by a single network device (106), and the monitored condition viewable by a single user interface (110), it is understood that multiple electric drives can be monitored by a single or multiple network devices and the monitored condition of the multiple electric drives can be viewable over multiple user interfaces within the industrial network or with different client devices. Also the network device(s) and the client device(s) can be part of the same communication network.

In an embodiment, the network device (106) is a server capable of communicating over a cloud network. In another embodiment, the network device is one of a gateway device and an edge device capable of communicating with the electric drive (e.g. via a communication interface of the drive). The network device may communicate with an Ethernet adaptor that is provided (or communicatively linked) with the electric drive (102), for obtaining data related to a condition of the electric drive (102).

The network device (106) may determine the condition based on the obtained data, for controlling the drive. The network device can optionally communicate the condition to the client device (112). In an embodiment, the client device (112) is a computing device with a user interface (110) (e.g. a HMI rendered with an online monitoring portal) that displays the condition of the electric drive (102). In another embodiment, the client device (112) is a mobile device that communicates with the network device (106) over a wireless communication network.

Maintenance personnel may view the condition provided on the user interface (110). In case, the condition indicates a fault conditions or an abnormal condition that necessitates a warning situation, the maintenance personnel may take preventive measures to avoid occurrence of such conditions at the future instant of time. Determining of the condition of the electric drive (102) by the network device (106) is explained in reference to FIGS. 2 and 3.

Figure 2:
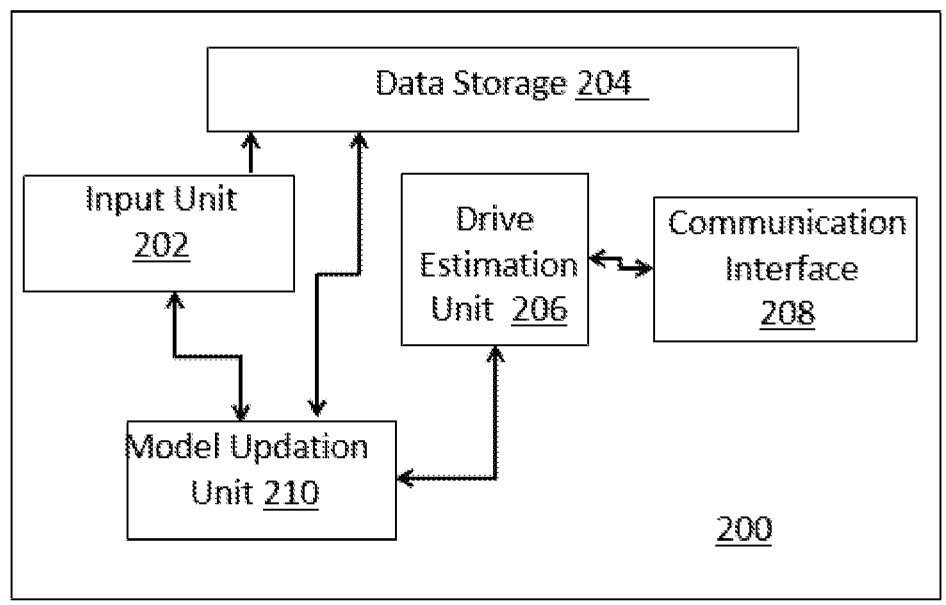
FIG. 2 is a block diagram of a system to monitor a condition of an electric drive, according to an embodiment of the present disclosure.

FIG. 2 is a block diagram of a system (200) for monitoring the condition of the electric drive, according to an embodiment of the present disclosure. The system (200) includes a plurality of modules for the condition monitoring. The plurality of modules may be implemented with one or more processors associated with a device in the industrial network. For example, the modules may be implemented with a processor of the network device, or the modules may be implemented at a server connected with the industrial network, or the modules may be distributed in processors of one or more devices connected in the industrial device (e.g. some modules may be provided in a gateway device and some on the server). In the embodiment of FIG. 2, the system includes an input unit (202), a drive estimation unit (206), a data storage (204), a model updation unit (210), and a communication interface (208). Each of the plurality of modules performs one or more steps of a method for monitoring a condition of an electric drive, as disclosed in FIG. 3.

Figure 3:
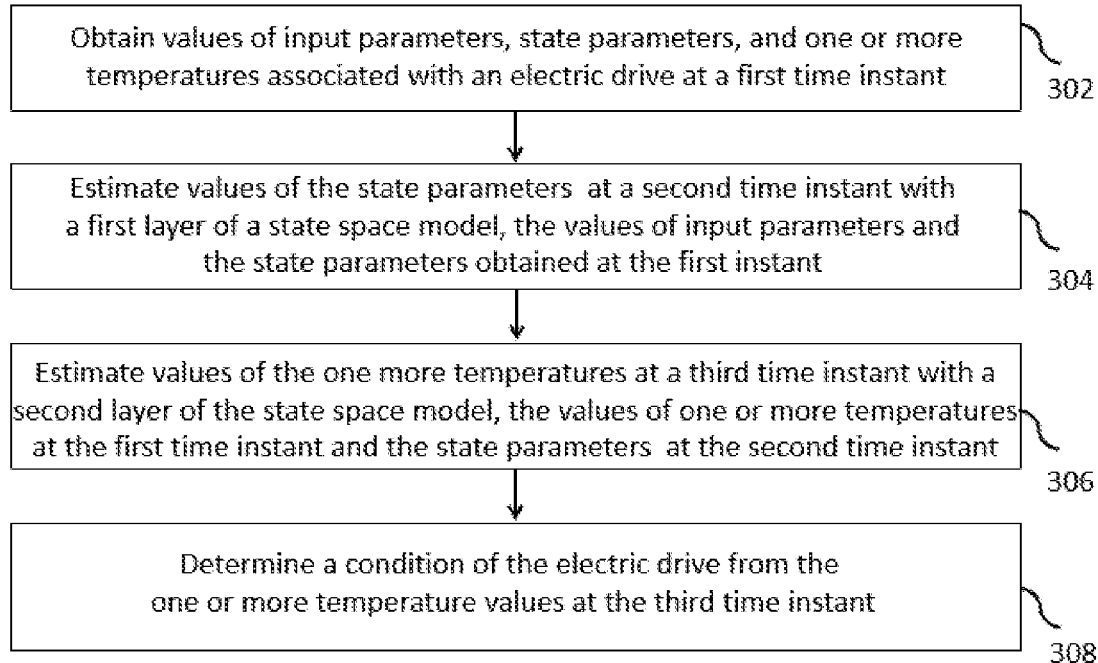
FIG. 3 is a flowchart of a method for monitoring the condition of the electric drive, according to an embodiment of the present disclosure.

FIG. 3 is a flowchart of the method for monitoring the condition of the electric drive (for example 102). The method may be performed with the system (for example 200 or network device 106) that is communicatively coupled with the electric drive in the industrial network. The condition is monitored by estimating values of the one or more temperatures associated with one or more components of the electric drive. In an embodiment, the one or more temperatures comprise a heatsink temperature, a control board temperature, and a temperature of body of the electric drive.

At step 302, values of input parameters (input values), state parameters (state values) and the one or more temperatures (temperature values) are obtained at first time instant. The values are obtained by an input unit (e.g. 202). The input parameters are associated with an operation of the electric drive. In an embodiment, the input parameters include of a voltage(Udc) across one or more components of the electric drive, a switching frequency ($F_{switch}$) of an inverter of the drive, an ambient temperature (T ambient) at the electric drive, and a time period (Fan_On(t)) of operation of a component of the electric drive. The input parameters may also include an on time of a break chopper circuit associated with the electric drive, as the break chopper circuit dissipates DC link energy which results in rise in temperature of the one or more components. The input parameters may also include static thermal parameters retrieved form a data sheet of the one or more components. For example the static thermal parameters of an inverter may be retrieved from an IGBT data sheet.

The state parameters are associated with an output of the electric drive. In an embodiment, the state parameters include, a current (Idc) flowing through the one or more components of the drive (e.g. inverters, diodes etc.), a frequency(Freq) of the output current, and energy transferred (E_kWh) to the electric motor (e.g. 104) from the electric drive over a time period (e.g. an hour). The current flowing through the components can be a measure current flowing through an inverter(s) comprising of insulated gate bipolar transistors (IGBTs) and diodes. The output current affects the one or more temperatures of the electric drive through conduction losses ($i^2R$, where 'R' is the effective resistance of the inverter and T is the output current). Similarly, the frequency (Freq) of the output current (i), affects a power of the electric drive, as reduction in impedance of the inverter at low frequency results in increase in the current, which in turn affects a temperature rise. In an example, E_kWh is a measured last one-hour energy transferred to the electric motor.

At step 304, values of the state parameters at a second time instant are estimated by the drive estimation unit (e.g. 206). The values of the input parameters and the state parameters obtained at the first time instant, are provided as an input to a first layer of a state space model of the electric drive in order to obtain the estimation of the values of the state parameters at the second time instant, as an output of the first layer.

At step 306, values of the one or more temperatures at a third time instant are estimated by the drive estimation unit. The values of the one or more temperatures obtained at the first time instant, and the values of the state parameters estimated for the second time instant are provided as an input to a second layer of the state space model of the electric drive, to obtain the values of one or more temperatures at the third time instant as an output of the second layer.

Figure 4:
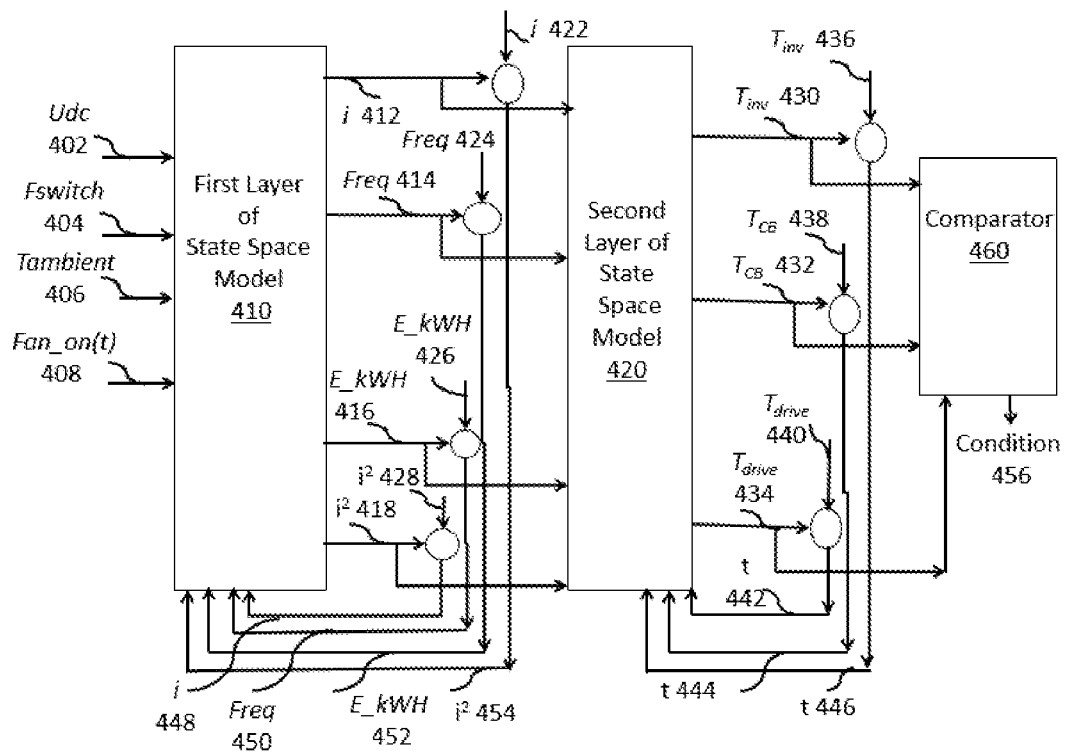
FIG. 4 is a schematic diagram illustrating usage of a state space model for determining the condition of the electric drive, according to an embodiment of the present disclosure.

The state space model is a two-layer model, which represents a thermal behavior of the electric drive. The state space model can provide an estimation of the one or temperature values of the electric drive, for example at a certain time instant, based on input values and state values as received. The state space model has two layers as shown in FIG. 4. The model is trained (e.g. to update model coefficients) by a model updation unit (e.g. 210) in accordance with an embodiment. Once the state space model is trained, it is used for estimating the one or more temperature values. For training purpose, the model updation unit uses the input values, the state values, and the temperature values obtained over a period of time.

The first layer of the state space model corresponds to an internal drive operation of the electric drive, and represents a relationship between the input parameters and the state parameters. The first layer includes a forced response matrix (Q) that contains one or more coefficients associated with the input parameters and a natural response matrix (P) that includes coefficients of the state parameters. The first layer can be illustrated as follows:

$$\begin{bmatrix} i(n+1) \\ Freq(n+1) \\ E\_kWh(n+1) \\ i^2(n+1) \end{bmatrix} = P_{4\times4} \cdot \begin{bmatrix} i(n) \\ Freq(n) \\ E\_kWh(n) \\ i^2(n) \end{bmatrix} + Q_{4\times4} \cdot \begin{bmatrix} Udc(n) \\ F_{switch}(n) \\ T_{ambient} \\ Fan\_On(t) \end{bmatrix},$$

where Udc(n) 402, $F_{switch}$(n) 404, $T_{ambient}$ 406 and $Fan_{On(t)}$ 408, are the input values at the first instant, i(n), Freq(n), $E_{kW}$h(n), and $i^2$ (n), are the state values at the first instant, and i(n+1) 412, Freq(n+1) 414, $E_{kW}$h(n+1) 416, and $i^2$(n+1) 418 are the state values estimated at the second time instant.

A first order iterative optimization method such as a gradient descent or a recurrent neural network based method, is used for training the model coefficients linked with the first layer. Input to the gradient descent or the recurrent neural network method is a difference between estimated state values at a time instant with measured values of the state parameters at the time instant. One or more coefficients of the forced response matrix (Q) and the natural response matrix (P) are updated to reduce the difference between the measured and estimated state values. Such updating optimizes an initial performance of the first layer that is based on certain predetermined values (e.g. based on the operator knowledge about the drive, or randomly initialized). As a result, accuracy of estimating the state values is improved.

The second layer of the state space model represents thermal dynamics of the electric drive. The second layer defines a relationship between the state parameters and the one or more temperatures as shown below;

$$\begin{bmatrix} T_{inv}(n+1) \\ T_{CB}(n+1) \\ T_{Drive}(n+1) \end{bmatrix} = R_{3\times3} \cdot \begin{bmatrix} T_{inv}(n) \\ T_{CB}(n) \\ T_{Drive}(n) \end{bmatrix} + S_{3\times4} \cdot \begin{bmatrix} i(n) \\ Freq(n) \\ E\_kWh(n) \\ i^2(n) \end{bmatrix},$$

where matrix (R) includes coefficients associated with the one or more temperatures, matrix (S) includes coefficients associated with the state parameters. $T_{inv}$(n), $T_{CB}$(n), and $T_{Drive}$(n) represent the one or more temperatures obtained at the first time instant, i(n) 412, Freq(n) 414, $E_{kW}$h(n) 416, and $i^2$(n) 418 represent the state values estimated at the second time instant, and $T_{inv}$(n+1) 430, $T_{CB}$ (n+1) 432, and $T_{Drive}$ (n+1) 434, represent the one or more temperature values estimated at the third time instant.

The first order iterative optimization method is used for training the second layer of the model. Input to the method is a difference between the estimated and measured values of the one or more temperatures. One or more coefficients of the matrix (R) and the matrix (S) are updated to reduce the difference between the measured and estimated temperature values. The training optimizes an initial performance of the second layer that is based on certain predetermined values (e.g. provided by operator or randomly initialized). As a result, accuracy of estimating the temperature values is improved.

The training of the state space model can be performed for real time control in edge computing devices, or may be implemented in a server on a cloud (i.e. on the system or network device). Once the state space model is trained (or updated), it is used (e.g. by the drive estimation unit) for estimating temperature values.

At step 308, a condition from one or more conditions of the electric drive is determined. The temperature values estimated for the third time instant is used for determining the condition. The temperature values may be provided to a comparator (e.g. 460), that compares the temperature values with one or more predetermined thresholds. The comparator may be an integral part (or a separate logic) of the drive estimation unit.

The one or more predetermined thresholds represent severity associated with the one or more conditions. For example, the one or more predetermined thresholds include a first threshold and a second threshold. These thresholds may be determined based on fault data available for the electric drive. Also, same or different thresholds may be set for heatsink, circuit board, overall drive etc. Thus, an operator can set temperature values that define normal operating condition for the drive or components of the drive. Alternately, these may be learnt by the system and used for estimation.

In an embodiment, the comparator determines the condition to be a normal operating condition when a value of a temperature of the one or more temperatures is less than the first threshold for the temperature. Alternately, the comparator determines the condition to be a warning condition when a value of a temperature of the one or more temperatures is greater than the first threshold but less than a second threshold for the temperature. In another instance, the comparator determines the condition as a fault condition when a value of a temperature of the one or more temperatures is greater than the second threshold for the temperature.

In an embodiment, the drive estimation unit determines a confidence indicator associated with an occurrence of the condition at the third time instant. The confidence indicator is based on history data of the condition determined for the electric drive. The confidence indicator indicates a confidence or a probability of the drive being in the condition at the third time instant. In an embodiment, when the condition determined is a fault condition, a timer is provided to display a time left before occurrence of the fault condition. A communication interface (e.g. 208) is used to provide the condition determined at the third instant to a user interface (e.g. 110) coupled to the system (e.g. 106).

Figure 5:
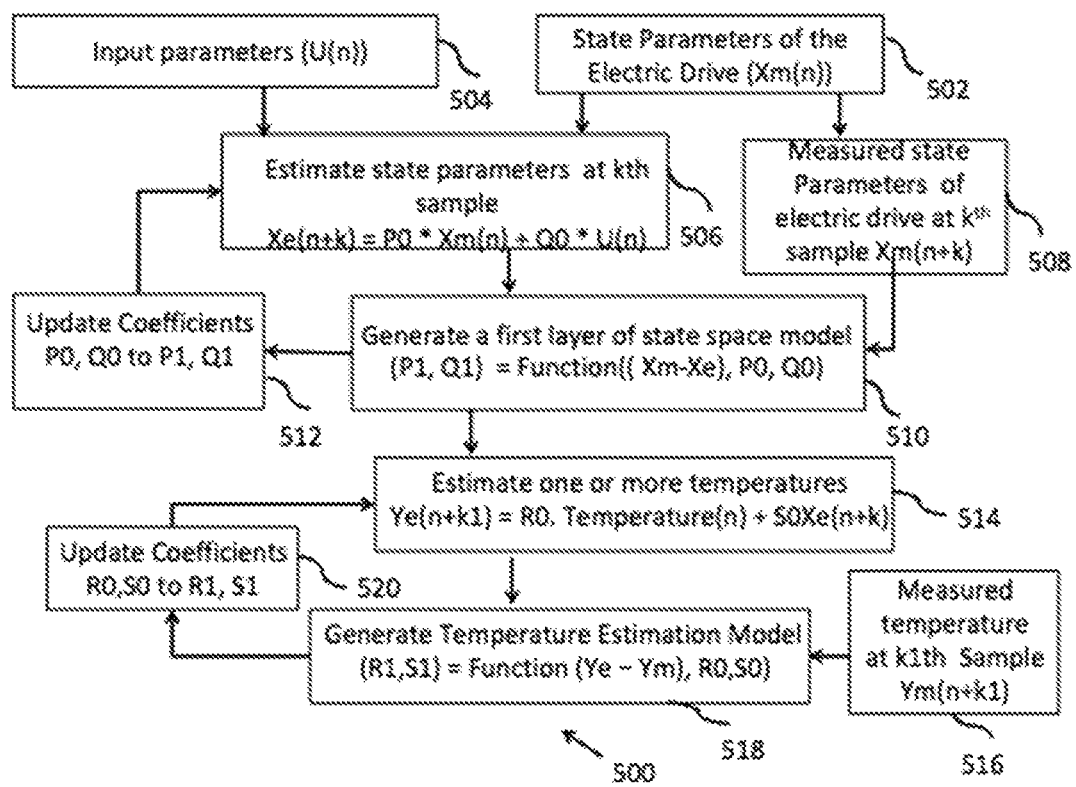
FIG. 5 is a flow diagram of updating the state space model of the electric drive, according to an embodiment of the present disclosure.

FIG. 5 is a flow diagram of training (updating) the state space model using discrete samples of input values, state values and temperature values.

At 502, values for state parameters $Xm(n)$, of an electric drive are obtained.

At 504, values for input parameters $U(n)$ of an electric drive are obtained.

At 506, the state parameters at kth sample ($Xe(n+k)$), are estimated by a first layer of the state space model. The first layer of the state space model is represented by the following equation:

$$Xe(n+k)=P0*Xm(n)+Q0*U(n).$$

At 508, measured state parameters ($Xm(n+k)$) of the electric drive at the kth sample are obtained (e.g. by sensors on the electric drive).

At 510, the first layer of the state space model, is generated as a function of initial coefficients P0 and Q0, and difference of the estimated state values $Xe(n+k)$ and the measured state values $Xm(n+k)$. Accordingly, the coefficients of the input parameters viz. P0 are updated to P1 and the coefficients of the state parameters Q0 are updated to Q1 at 512. Aforesaid updation of coefficients results in accurate estimation of state values obtained as an output of step 510.

At 514, using the estimated state values at the kth sample, obtained as the output of step 510, one or more temperature values at kith sample are estimated by a second layer of the state space model. The second layer is represented by the following equation:

$$Ye(n+k1)=R0 \cdot \text{Temperature}(n)+S0 Xe(n+k)$$

At 516, measured state values ($Ym(n+k1)$) of the electric drive at the kith sample are obtained (e.g. by sensors on the electric drive).

At 518, the second layer of the state space model is generated as a function of initial coefficients R0 and S0, and difference of the estimated one or more temperature values $Ye(n+k1)$ and the measured one or more temperature values $Ym(n+k1)$. Accordingly, the coefficients of the temperatures viz. R0 are updated to R1 and the coefficients of the state parameters S0 are updated to S1 at 520. Aforesaid updation of coefficients of the second layer, results in accurate estimation of the one or more temperatures values.

The updated coefficients of the state space model are implemented to estimate the condition of the electric drive at a future time instant by estimating the one or more temperature values at the future time instant. A flow diagram explaining the usage of the updated state space model is shown in FIG. 6

Figure 6:
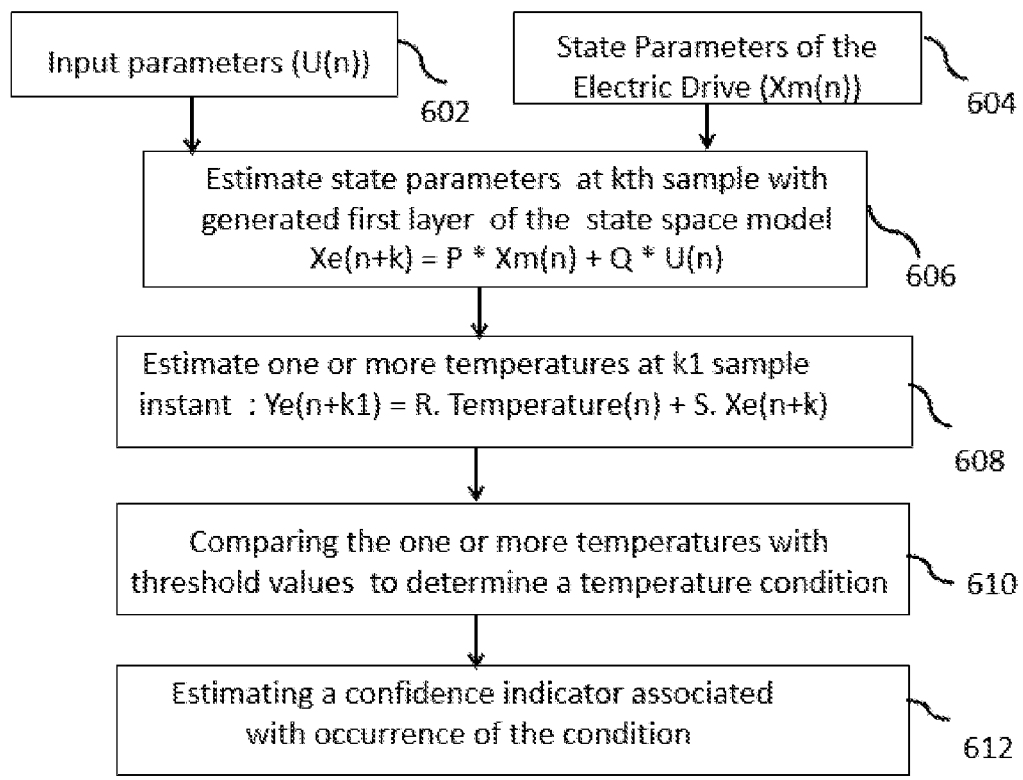
FIG. 6 is a flow diagram illustrating usage of the state space model for determining the condition of the electric drive, according to another embodiment of the present disclosure.

FIG. 6 is a flow diagram that shows determining the condition of the electric drive using the state space model.

At 602, values of input parameters $U(n)$, and, at step 604, values of state parameters $Xm(n)$, of a current sample 'n' are provided as inputs to the state space model.

At 606, the state values are estimated at a kth sample, by using a first layer of a state space model represented below:

$$Xe(n+k)=P*Xm(n)+Q*U(n),$$

where P and Q indicated updated coefficients as obtained during training of the first layer.

At 608, at k1 sample one or more temperature values of one or more components of the electric drive are estimated with the second layer as represented below:

$$Ye(n+k1)=R \cdot \text{Temperature}(n)+S \cdot Xe(n+k),$$

where R and S represent updated coefficients of the second layer.

At step 610, the estimated temperature values are compared with one or more predetermined thresholds, to determine a condition of the electric drive at the k1 sample. For example, if the estimated temperature exceeds a predetermined temperature, the condition is determined to be a fault condition that may occur at the k1 sample. The estimation of the drive condition can be used to control the temperature values.

Optionally, at step 612, a confidence indicator associated with occurrence of the condition is determined. The confidence indicator is communicated along with the determined condition to a user interface that is accessible to maintenance personnel. An example of estimation of the temperature values form the input values, state values and temperature values is explained with reference to FIG. 7A-7C.

Figure 7A:
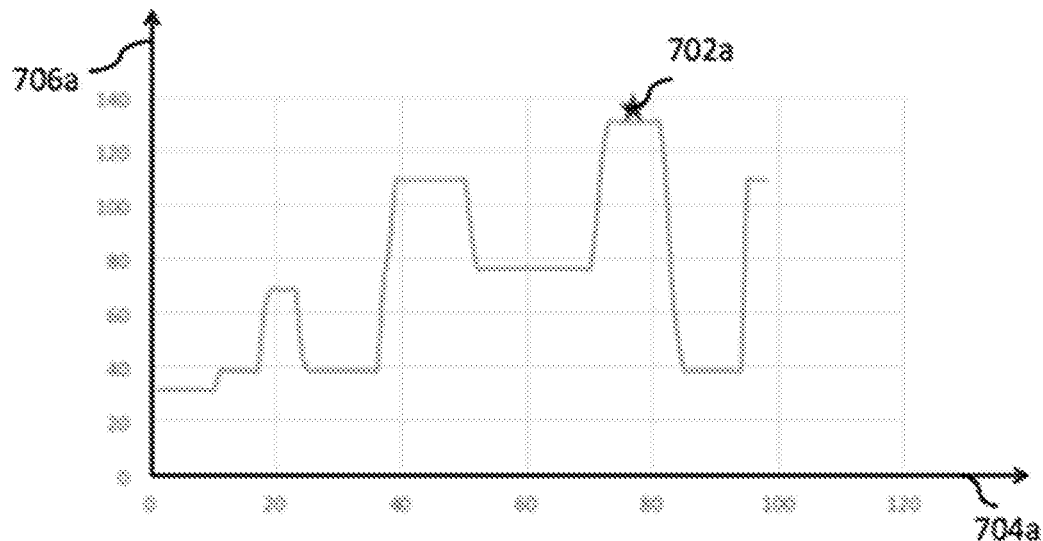
FIG. 7A is a graphical representation of an input parameter provided to the state space model of the electric drive, according to an embodiment of the present disclosure.
Figure 7B:
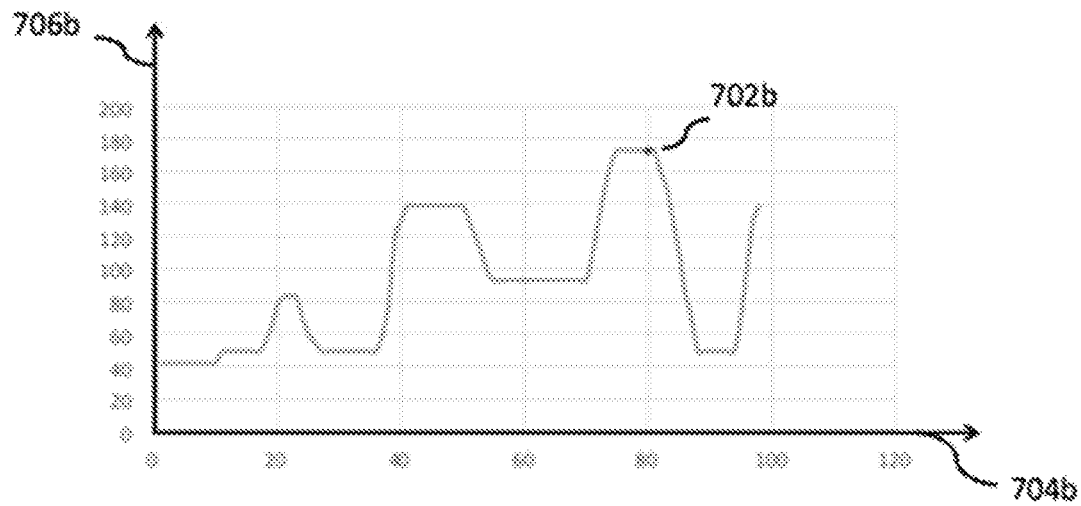
FIG. 7B is a graphical representation of an estimated state value provided by a first layer of the state space model, according to an embodiment of the present disclosure.
Figure 7C:
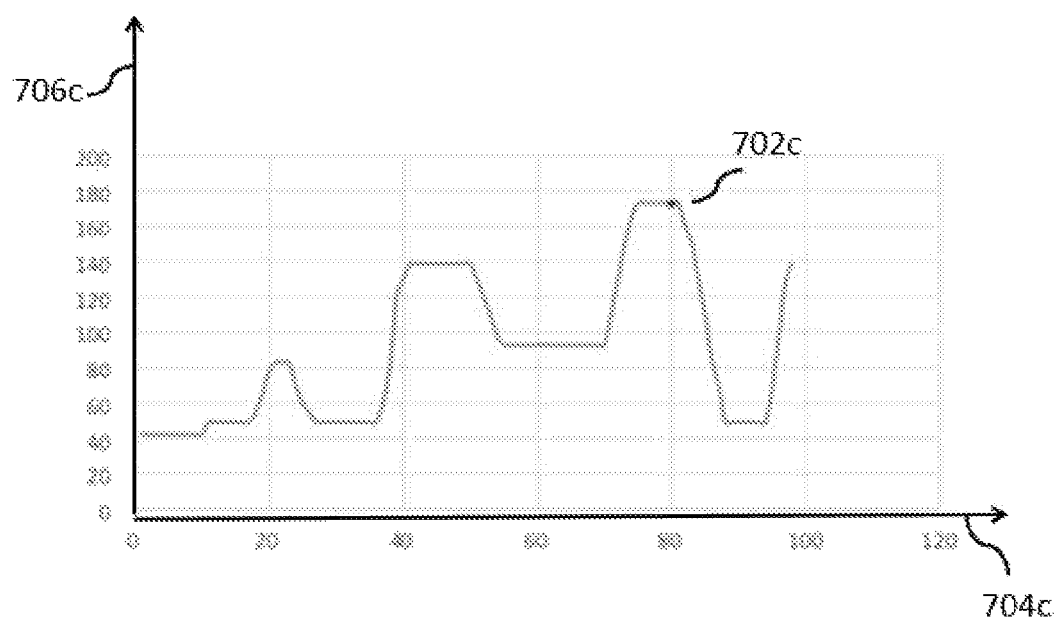
FIG. 7C is a graphical representation of an estimated output temperature value provided by the state space model, according to an embodiment of the present disclosure.

FIG. 7A illustrates an input parameter viz. input current (i) whose magnitude is plotted against time axis 704a (in hours). Value of the input parameter at time instant of 70 hours is shown as 702a. Output of the first layer of the state space model will give an estimated value for a state parameter, for example an output current, at a time ahead of 70 hours, which is 75 hours in the example. The estimated value for the state parameter is shown as 702b. Further, the temperature value is estimated at a time ahead of 75 hours viz. 80 hours, which is shown as 702c. Thus, the operator can view the temperature value of the drive or components of the drive.

Disclosed method and system enables estimation of drive conditions, in advance (e.g. few hours before the temperature condition actually occurs). The condition information can be used to take preventive actions to safeguard the electric drive (and components). The method ensures a higher level of control or application control over the electric drive, and facilitates initiation of appropriate safe action to prevent faults. The estimation of temperature values and related faults can be used for planned maintenance or drive control.

The invention claimed is:

1. A method for monitoring a condition of an electric drive based on estimation of values of one or more temperatures associated with one or more components of the electric drive, wherein the electric drive controls operation of an electric motor and is communicatively coupled to a network device in an industrial network, the method comprising:
  obtaining, with the network device, (i) values of input parameters associated with an operation of the electric drive at a first time instant, (ii) values of state parameters associated with an output of the electric drive at the first time instant, and (iii) values of the one or more temperatures associated with the one or more components at the first time instant;
  estimating, with the network device, values of the state parameters at a second time instant using (i) a first layer of a state space model of the electric drive, (ii) the values of the input parameters at the first time instant, and (iii) the values of the state parameters obtained at the first time instant, wherein the state space model is a two layer model which represents a thermal behavior of the electric drive;
  estimating, with the network device, values of the one or more temperatures at a third time instant using (i) a second layer of the state space model of the electric drive, (ii) the values of the one or more temperatures obtained at the first time instant, and (iii) the values of the state parameters estimated at the second time instant, wherein the third time instant is a predetermined number of hours after the first time instant and the second time instant;
  determining, with the network device, a condition from among one or more conditions of the electric drive based on (i) the values of the one or more temperatures estimated at the third time instant and (ii) one or more predetermined thresholds, wherein the one or more predetermined thresholds represent severity associated with the one or more conditions;
  providing the determined condition to a remote user-interface associated with the network device; and
  performing preventive maintenance actions on the electric drive, wherein the preventive maintenance actions comprises of reducing an input current to the electric drive or increasing a cooling time of the electric drive based on the determined condition.

2. The method of claim 1, wherein the first layer of the state space model comprises one or more coefficients associated with the input parameters and the state parameters, wherein the one or more coefficients are updated with history data of the input parameters and of the state parameters, using a first order iterative optimization method.

3. The method of claim 1, wherein the second layer of the state space model comprises one or more coefficients associated with the state parameters and the one or more temperatures, wherein the one or more coefficients are updated with history data of the state parameters and of the temperatures, using a first order iterative optimization method.

4. The method of claim 1, wherein determining the condition from among the one or more conditions of the electric drive comprises comparing the values of the one or more temperatures estimated at the third time instant with the one or more predetermined thresholds, wherein the condition is a normal operating condition when the value of the temperature of the one or more temperatures is less than a first threshold for the temperature, wherein the condition is a warning condition when a value of a temperature of the one or more temperatures is greater than the first threshold but less than a second threshold for the temperature, and wherein the condition is a fault condition when a value of a temperature of the one or more temperatures is greater than the second threshold for the temperature.

5. The method of claim 4, wherein determining the condition from among the one or more conditions of the electric drive further comprises estimating a confidence indicator associated with an occurrence of the condition at the third time instant, wherein the confidence indicator is based on historic data of the condition determined for the electric drive.

6. The method of claim 1, wherein determining the condition from among the one or more conditions of the electric drive further comprises estimating a confidence indicator associated with an occurrence of the condition at the third time instant, wherein the confidence indicator is based on historic data of the condition determined for the electric drive.

7. The method of claim 1, wherein the input parameters comprise one or more of a voltage across one or more components of the electric drive, a switching frequency of an inverter of the electric drive, an ambient temperature at the electric drive, and a time period of operation of one or more components of the electric drive.

8. The method of claim 1, wherein the state parameters comprise one or more of a current flowing through one or more components of the electric drive, a frequency of the output current, and energy transferred to the electric motor from the electric drive over a time period.

9. The method of claim 1, wherein the one or more temperatures comprise a heatsink temperature, a control board temperature, and temperature of body of the electric drive.

10. A system configured to be communicatively coupled to an electric drive in an industrial network to monitor a condition of the electric drive based on estimation of values of one or more temperatures associated with one or more components of the electric drive, the electric drive being configured to control operation of an electric motor, the system comprising:
  a processor configured to:
    receive (i) values of input parameters associated with an operation of the electric drive, (ii) values of state parameters associated with an output of the electric drive, and (iii) values of the one or more temperatures associated with the one or more components;
    update one or more coefficients associated with a state space model which represents a thermal behavior of the electric drive, wherein the state space model comprises a first layer and a second layer, wherein the one or more coefficients are updated based on the values received at the processor over a period of time; and—
estimate values of the state parameters at a second time instant with the first layer of the state space model based on the values of the input parameters at a first time instant and the values of the state parameters received at the first time instant;
estimate values of the one or more temperatures at a third time instant with the second layer of the state space model based on the values of the one or more temperatures received at the first time instant and the values of the state parameters estimated at the second time instant, wherein the third time instant is a predetermined number of hours after the first time instant and the second time instant; and
determine, from among one or more conditions of the electric drive, a condition of the electric drive at a third time instant based on the values of the one or more temperatures estimated at the third time instant and one or more predetermined thresholds, wherein the one or more predetermined thresholds represent severity associated with the one or more conditions;
a communication interface configured to provide the determined condition to a user interface associated with the system; and
wherein the processor is further configured to:
perform preventive maintenance actions on the electric drive, wherein the preventive maintenance actions comprises of reducing an input current to the electric drive or increasing a cooling time of the electric drive based on the determined condition based on the determined condition.

11. The system of claim 10, further comprising a data storage to store the state space model, the one or more predetermined thresholds, the values received at the processor, and the values estimated by the processor.

12. The system of claim 10, wherein determining the condition from among the one or more conditions of the electric drive comprises comparing the values of the one or more temperatures estimated at the third time instant with the one or more predetermined thresholds, wherein the condition is a normal operating condition when a value of a temperature of the one or more temperatures is less than a first threshold for the temperature, wherein the condition is a warning condition when a value of a temperature of the one or more temperatures is greater than the first threshold but less than a second threshold for the temperature, and wherein the condition is a fault condition when the value of the temperature of the one or more temperatures is greater than the second threshold for the temperature.

13. The system of claim 10, wherein determining the condition from among the one or more conditions of the electric drive comprises further estimating a confidence indicator associated with an occurrence of the condition at the third time instant, wherein the confidence indicator is based on historic data of the condition determined for the electric drive.

14. The system of claim 10, wherein the input parameters comprise one or more of a voltage across one or more components of the electric drive, a switching frequency of an inverter of the electric drive, an ambient temperature at the electric drive, and a time period of operation of one or more components of the electric drive.

15. The system of claim 10, wherein the state parameters comprise one or more of a current flowing through one or more components of the electric drive, a frequency of the output current, and energy transferred to the electric motor from the electric drive over a time period.

16. The system of claim 10, wherein the one or more temperatures comprise a heatsink temperature, a control board temperature, and temperature of body of the electric drive.

17. The method of claim 1, wherein providing the determined condition comprises:
based on determining that the determined condition is a fault, providing instructions for the remote user-interface to display a timer, wherein the timer indicates a time left before an occurrence of the determined condition at the third time instant.

18. The method of claim 17, wherein providing the determined condition to the remote user-interface further comprises providing a confidence indicator associated with an occurrence of the determined condition at the third time instant, wherein the confidence indicator is based on historic data of the condition determined for the electric drive.

* * * * *